United States Patent
Kano et al.

Patent Number: 5,838,690
Date of Patent: Nov. 17, 1998

[54] METHOD FOR DYNAMICALLY ASSIGNING COMMUNICATION BANDS

[75] Inventors: Hideaki Kano; Kensuke Inoue, both of Yokohama; Naoki Ono, Kawasaki, all of Japan

[73] Assignee: Hitachi, Ltd., Tokyo, Japan

[21] Appl. No.: 747,676

[22] Filed: Nov. 12, 1996

[30] Foreign Application Priority Data

Nov. 13, 1995 [JP] Japan ................................ 7-293209

[51] Int. Cl.$^6$ ........................................................ H04J 3/00
[52] U.S. Cl. ........................................ 370/468; 370/401
[58] Field of Search ..................................... 370/401, 404, 370/437, 442, 443, 458, 463, 465, 468, 477, 498, 532, 533, 534, 535

[56] References Cited

U.S. PATENT DOCUMENTS

| | | | |
|---|---|---|---|
| 5,351,240 | 9/1994 | Highsmith | 370/468 |
| 5,506,844 | 4/1996 | Rao | 370/468 |
| 5,535,207 | 7/1996 | Dupont | 370/433 |

*Primary Examiner*—Dang Ton
*Attorney, Agent, or Firm*—Antonelli, Terry, Stout & Kraus, LLP

[57] ABSTRACT

In a network, an inter-network connection unit is connected to perform transmission of data between the network and another network. The inter-network connection unit is furthermore connected to a multiplexer. Between the multiplexer and another multiplexer to which an inter-network unit installed in the other network is connected, data transmission is performed via a multiplex line. The multiplexer changes the communication capacity of a communication line connecting the inter-network connection unit to the multiplexer in accordance with the data transmission quantity between the multiplexer and the inter-network connection unit connected thereto and dynamically changes the communication band assigned to the inter-network connection unit in accordance with the change of the communication capacity.

14 Claims, 6 Drawing Sheets

FIG. 2A

| TERMINAL DEVICE | COMMUNICATION BAND |
|---|---|
| ROUTER 30/40 | 200kbps |
| TERMINAL A | 10 |
| TERMINAL B | 30 |
| . . . | . . . |

| TIME | COMMUNICATION BAND |
|---|---|
| 09 : 00 | 200kbps |
| 18 : 00 | 100 |

METHOD FOR DYNAMICALLY ASSIGNING COMMUNICATION BANDS

BACKGROUND OF THE INVENTION

The present invention relates to a control method of communication bands in data transmission performed between networks. In particular, the present invention relates to a method of dynamically assigning communication bands which dynamically changes the communication rate between a multiplexer and an inter-network connection unit.

As a unit for multiplexing and transmitting digital information sent from a plurality of terminal devices such as information processors and PBXs, a multiplexer is known. For each of communicating terminal devices, the multiplexer assigns a communication band so that the terminal device may perform data transmission with another terminal device. In the case of voice communication represented by telephone, communication bands are assigned typically in the order of call origination. In the case where all communication bands for voice are in use, newly originated calls are not accepted until a speech currently in progress is terminated, resulting in a call loss. Since communication bands required for voice communication are fixed for respective calls, the communication bands can be estimated from the number of required calls. In the case of data communication, however, communication characteristics are similar to a burst and consequently it is difficult to uniquely assign communication bands. Typically without considering a real time increase or decrease of data transmission quantity, therefore, the maximum communication rate between terminal devices and the multiplexer is assigned as the communication band between multiplexers.

On the other hand, an inter-network connection unit such as a router or a gateway connecting a network to another network is a unit upon which the data traffic tends to concentrate. Therefore, a communication line having a large communication capacity is used as the communication line connecting an inter-network connection unit to the multiplexer. However, the data traffic in this case varies largely in accordance with a time zone, and a significant difference tends to be caused between a time zone having a large data traffic and a time zone having a small data traffic.

According to the above described conventional technique, the maximum communication rate of a communication line connecting an inter-network connection unit to a multiplexer is fixedly assigned as the communication band of the multiplexer even in the case where the data traffic passing through the inter-network connection unit is small. Therefore, uselessness is caused in the communication bands possessed by the multiplexer. This results in a problem that the communication bands are not used effectively by other terminal devices.

SUMMARY OF THE INVENTION

An object of the present invention is to efficiently assign the communication bands of a multiplexer to an inter-network connection unit.

To achieve the object, the concept of the present invention is featured by changing the communication capacity of a communication line connecting the inter-network connection unit to the multiplexer in accordance with the data transmission quantity and dynamically changing the communication band assigned to the inter-network connection unit in accordance with the change of the communication capacity. In accordance with a preferred aspect of the present invention, upon detection of the arrival of a predetermined time, the multiplexer changes the communication band assigned to the inter-network connection unit to a predetermined one with time and dynamically changes the communication rate of the communication line connecting the inter-network connection unit to the multiplexer in accordance with the change of the communication band. Furthermore, in accordance with another aspect of the present invention, the inter-network connection unit monitors the quantity of data transmitted to the multiplexer and issues to the multiplexer a request to change the communication rate, based on the result of monitoring. The multiplexer determines whether to accept the request. If the request is acceptable, change of the communication rate is effected and change of the communication band assigned to the inter-network connection unit is effected.

According to the present invention, the communication band for the inter-network connection unit is dynamically assigned in the communication bands held by the multiplexer, and consequently the whole of the communication bands can be used effectively.

DESCRIPTION OF THE PREFERRED EMBODIMENTS

Figure 1:
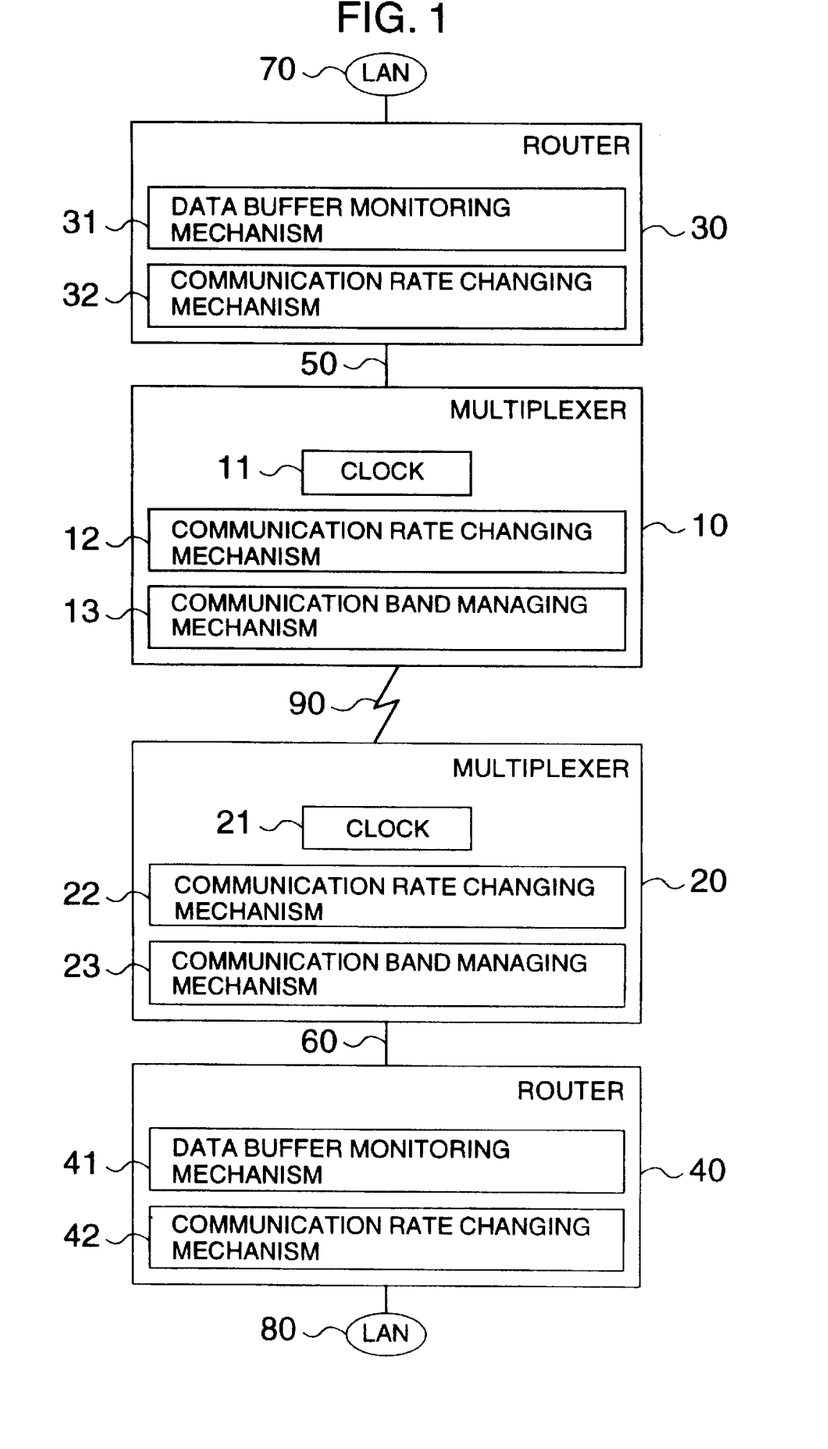
FIG. 1 is a configuration diagram of an inter-network connection system in an embodiment of the present invention.

FIG. 1 is a configuration diagram of an inter-network connection system according to an embodiment of the present invention. Numerals 70 and 80 denote local area networks (hereafter abbreviated to LAN) to which information processors and terminal devices are connected. Numerals 30 and 40 denote routers for connecting the LAN 70 to the LAN 80 and controlling data transmission effected between the LAN 70 and the LAN 80. Numerals 10 and 20 denote multiplexers for multiplexing digital information transmitted from a plurality of terminal devices and transmitting the multiplexed digital information. With reference to FIG. 1, the routers 30 and 40 are connected to the multiplexers 10 and 20, respectively. Together with the routers 30 and 40, other terminal devices and PBXs may be connected to the multiplexers 10 and 20. However, they are not illustrated. Numeral 50 denotes a communication line for connecting the multiplexer 10 to the router 30. Numeral 60 denotes a communication line for connecting the multiplexer 20 to the router 40. For the communication lines 50 and 60, a maximum communication rate and a minimum communication rate are determined beforehand and the communication rate can be changed within this range. Numeral 90 denotes a communication line for connecting the multiplexer 10 to the multiplexer 20. The communication line 90 is a multiplex line for conducting multiplex transmission of digital information sent from a plurality of terminal devices.

The multiplexers 10 and 20 have clocks 11 and 21, communication rate change mechanisms 12 and 22, and communication band managing mechanisms 13 and 23. The routers 30 and 40 have data buffer monitoring mechanisms 31 and 41, and communication rate changing mechanisms 32 and 42. The communication rate changing mechanisms 12, 22, 32 and 42 issue communication rate changeing requests and return replys to these changeing requests. Furthermore, the communication rate changing mechanisms 12 and 22 send out variable synchronizing clocks for determining the communication rates. By following the variable synchronizing clocks, the communication rate changing mechanisms 32 and 42 change the communication rates of the communication lines 50 and 60, respectively. The communication band managing mechanisms 13 and 23 manage the communication bands of the communication line 90. In accordance with a preset communication band assigning schedule, the communication band managing mechanisms 13 and 23 change the communication bands assigned to the routers 30 and 40. The clocks 11 and 21 hold the current time and are referred to by the communication band managing mechanisms 13 and 23. With respect to the communication rate changing requests issued by the communication rate changing mechanisms 32 and 42, respectively, the communication band managing mechanisms 13 and 23 determines whether the requests are acceptable on the basis of the vacancy state of the communication bands. The communication band managing mechanisms 13 and 23 notify the communication rate changing mechanisms 32 and 42 respectively via the communication rate changing mechanisms 12 and 22 whether the request are acceptable. The data buffer monitoring mechanisms 31 and 41 monitor vacant areas of communication buffers included in the routers 30 and 40, respectively. Depending upon the sizes of the vacant areas of the communication buffers, the data buffer monitoring mechanisms 31 and 41 request the communication rate changing mechanisms 12 and 22 to change the communication rates. The communication rate changing requests are issued via the communication rate changing mechanisms 32 and 42.

Figure 2A:
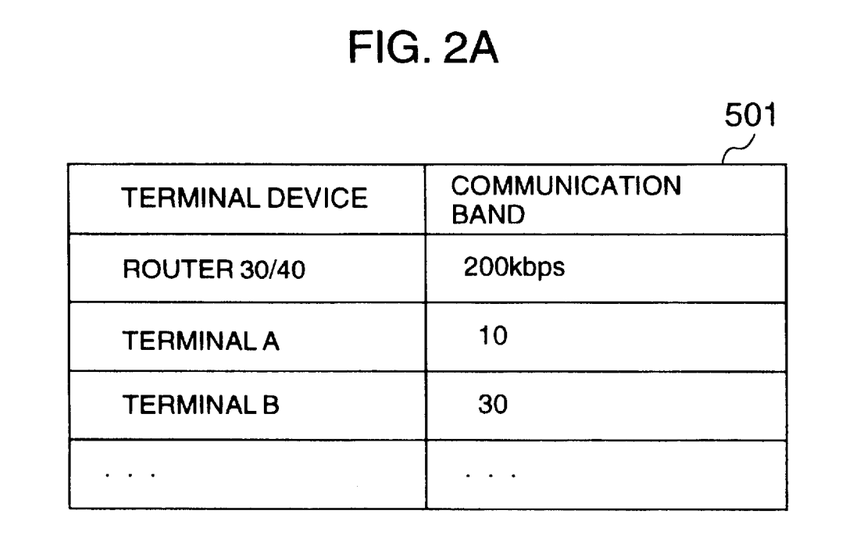
FIG. 2A is a table configuration diagram showing an example of a communication band managing table held by multiplexers 10 and 20.
Figure 2B:
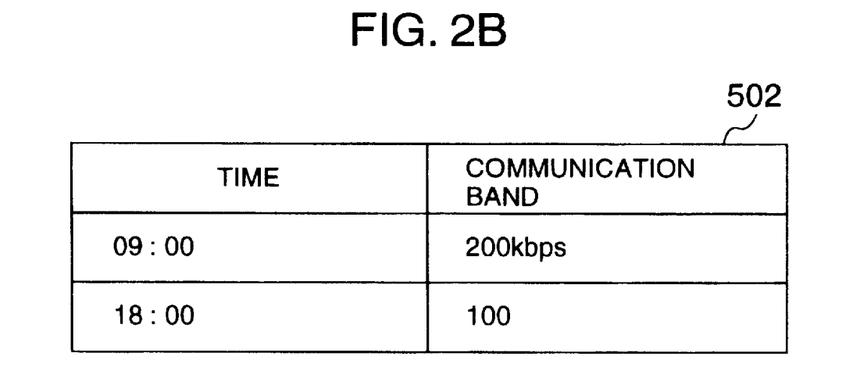
FIG. 2B is a table configuration diagram showing an example of a schedule managing table held by multiplexers 10 and 20.

FIG. 2A is a table configuration diagram showing an example of a communication band managing table stored in each of the multiplexers 10 and 20. In association with terminals and routers connected to the multiplexer, the communication band managing table 501 stores information concerning communication bands assigned to the terminals and routers. For example, the illustrated communication band managing table 501 represents that a communication band of 200 kbps is assigned to each router. FIG. 2B is a table configuration diagram showing an example of a schedule managing table stored in each of the multiplexers 10 and 20 together with the communication band managing table 501. The schedule managing table 502 stores managing schedule information of the communication band assigned to each of the routers 30 and 40. For example, the illustrated schedule managing table 502 represents that the communication band assigned to the router at "09:00" is changed to 200 kbps and the communication band assigned to the router at "18:00" is changeed to 100 kbps.

Figure 3:
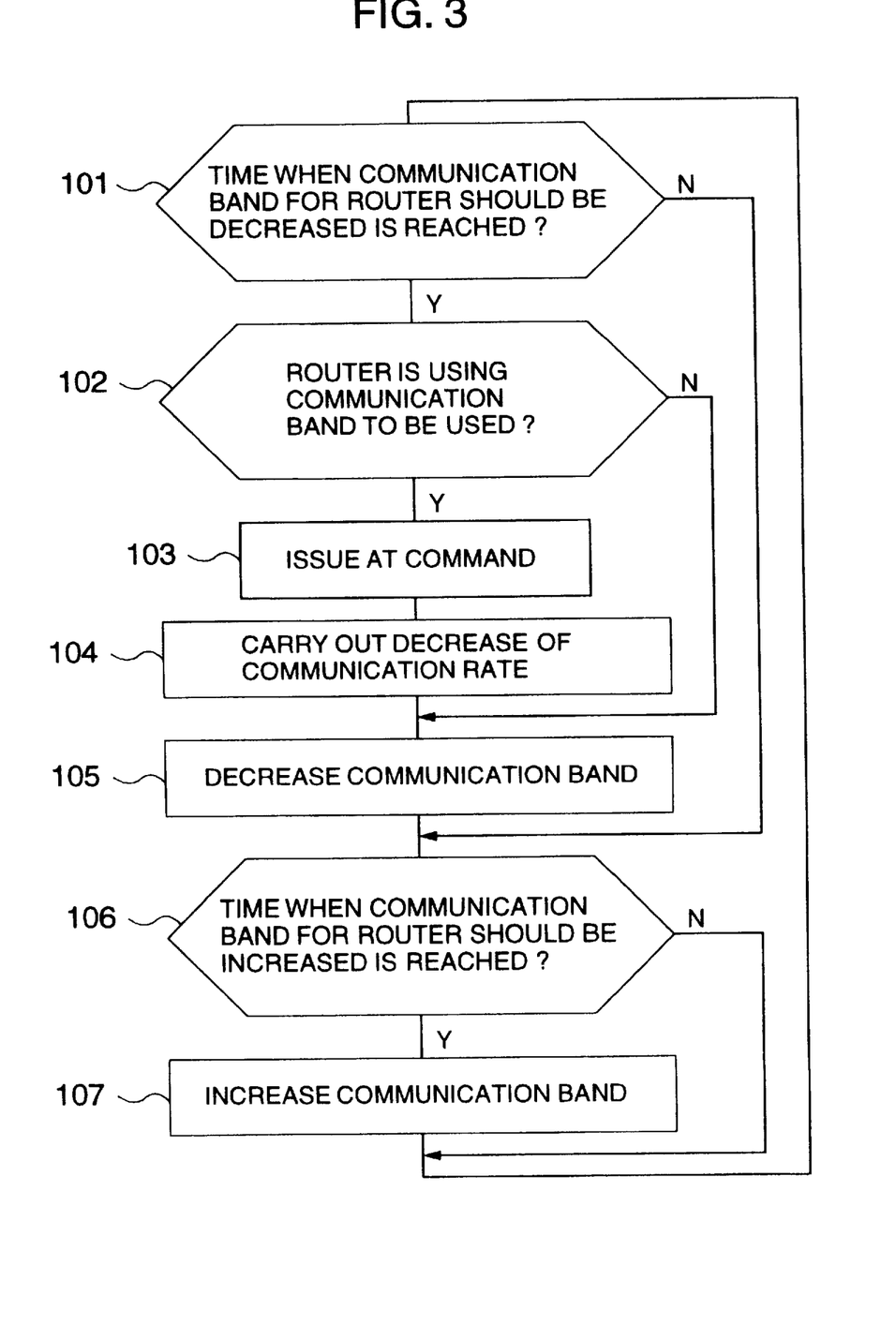
FIG. 3 is a flow chart showing the flow of processing of the multiplexer 10 for changeing the communication band of a router 30.

FIG. 3 is a flow chart showing the flow of processing conducted when changeing the communication band of the router 30. The communication band managing mechanism 13 of the multiplexer 10 compares the time preset in the schedule managing table 502 with the time indicated by the clock 11 (step 101). If the time when the communication band of the router 30 should be decreased is reached, the communication band managing mechanism 13 compares the communication band assigned to the router 30 at the current time with the communication band to be preset at the current time preset in the schedule managing table 502 and examines whether the router 30 is using the communication band to be decreased (step 102). If a communication band exceeding the communication band to be preset at the current time is assigned to the router 30, i.e., the router 30 is using the communication band to be decreased, the communication rate changing mechanism 12 is started to decrease the communication rate of the communication line 50. The communication rate changing mechanism 12 issues an AT command to the communication rate changing mechanism 32 of the router 30 (step 103). The AT command includes a communication rate to be preset as its parameter. Upon receiving a reply of acceptance from the communication rate changing mechanism 32, the communication rate changing mechanism 12 changes the synchronizing clock so as to match with the communication rate to be preset and decreases the communication rate of the communication line 50 (step 104). In the case where the quantity of data sent from the router 30 toward the multiplexer 10 is large, the router 30 returns a reply of denial or rejection. In this case, the multiplexer 10 issues an AT command again. If the router 30 receives an AT command from the multiplexer 10 again within a short period of time T, the router returns a reply of compliance. In the same way, the multiplexer 20 and the router 40 also conduct the processing of the steps 101 through 104 to decrease the communication rate of the communication line 60.

After exchanging control information and confirming the decrease of the communication band, the communication band managing mechanisms 13 and 23 change values of communication bands preset in entries associated with the routers 30 and 40 of the communication band managing table 502 to preset values (step 105). If the router 30 is not using the communication band to be decreased as a result of the decision at the step 102, then the processing of the steps 103 and 104 is bypassed and the processing of the step 105 is started.

Then the communication band managing mechanism 13 compares the time preset in the schedule managing table 502 with the time indicated by the clock 11 and determines whether the time when the communication band of the router 30 should be increased is reached (step 106). If the time when the communication band of the router 30 should be increased has been reached, the communication band assigned to the router 30 is changed to a preset value (step 107). In the same way, the communication band managing mechanism 23 also conducts the processing of the step 106, exchanges the control information with the communication band managing mechanism 13, and then conducts the processing of the step 107. In the case where the communication band is to be increased in accordance with the communication band assigning schedule preset in the schedule managing table 502, the communication band managing mechanisms 13 and 23 do not start the communication rate changing mechanisms 12 and 22. In this case, therefore, change of the communication rate for the communication lines 50 and 60 is not conducted.

Figure 4:
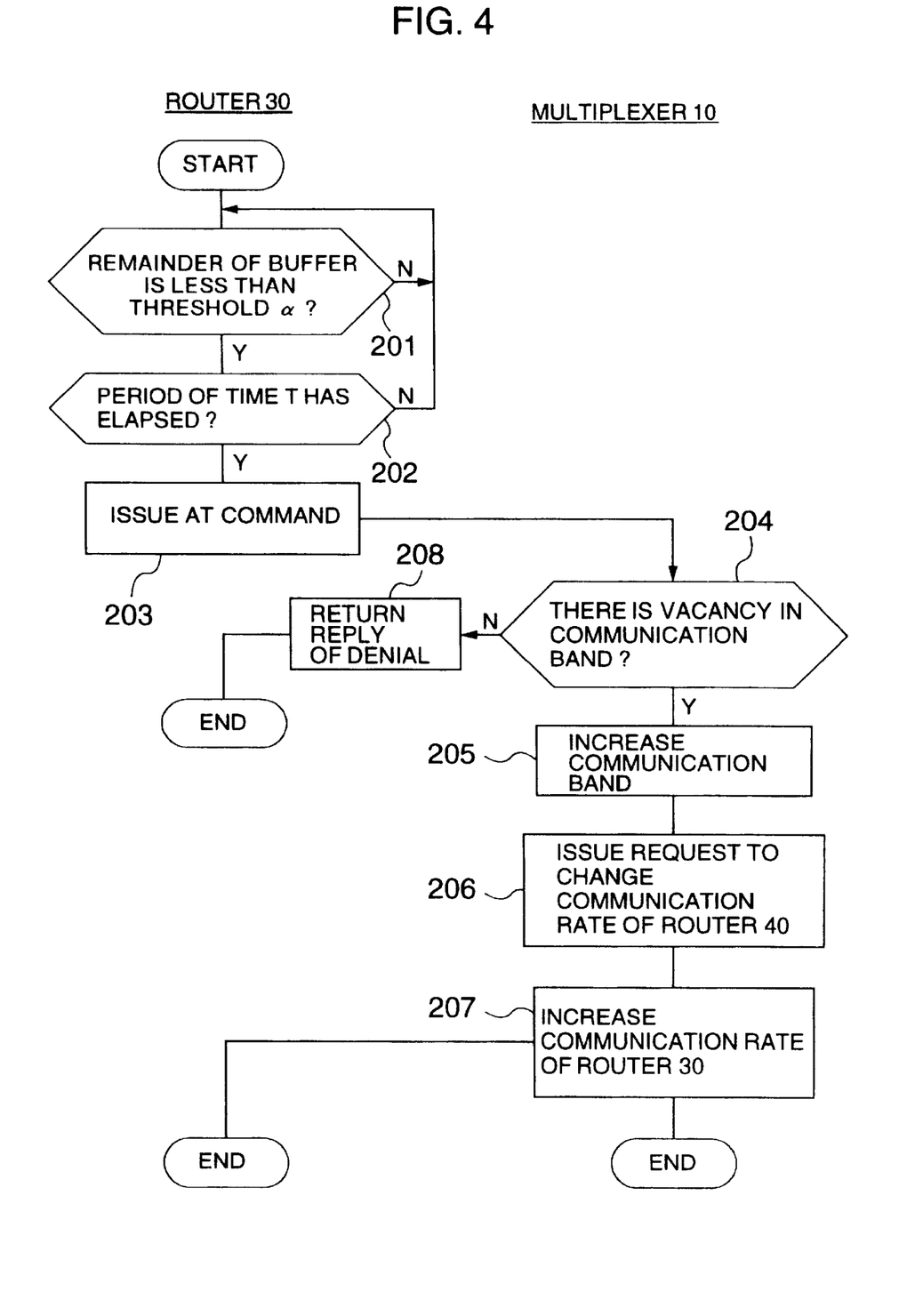
FIG. 4 is a flow chart showing the flow of processing for increasing the communication band.

FIG. 4 is a flow chart showing the flow of processing conducted when increasing the communication band in response to a request from a router and increasing the communication the communication rate of a communication line. Description will now be given of the case where the multiplexer 10 increases the communication band and the communication rate in response to a request from the router 30 as an example.

As the quantity of data transmitted from the LAN 70 toward the LAN 80 is increased, data to be sent out to the communication line 50 are gradually accumulated in a transmitting buffer (not illustrated) included in the router 30 and the vacant area in the transmitting buffer decreases. The data buffer monitoring mechanism 31 monitors the size of the vacant area of the transmitting buffer (step 201). If the size of the vacant area is less than a predetermined threshold $\alpha$, it is determined whether the state continuously lasts for a predetermined period of time T, i.e., whether the period of time T has elapsed since the size of the vacant area in the transmitting buffer became less than the threshold $\alpha$ (step 202). If the elapse of the period of time T is detected at the step 202, the data buffer monitoring mechanism 31 starts the communication rate changing mechanism 32. The communication rate changing mechanism 32 issues an AT command which is usually used as a MODEM controlling command, to the multiplexer 10 (step 203). This AT command includes, as a parameter thereof, information for specifying the communication rate of the next stage of the current communication rate in the direction of the maximum communication rate.

Upon receiving the above described AT command from the router 30, the multiplexer 10 refers to the communication band managing table 501 by using the communication band managing mechanism 13 and determines whether there is a vacancy in the communication bands (step 204). If the total quantity of the communication bands minus the sum total of communication bands currently assigned to the terminal devices can absorb the increase of the communication bands requested by the router 30, it means that there is a vacancy in the communication bands. If there is a vacancy in the communication bands, the communication band managing mechanism 13 exchanges the control information with the communication band managing mechanism 23, presets a value associated with the requested communication band in the entry of the communication band associated with the router of the communication band managing table 501, and changes the communication band assigned to the router 30 to a requested value (step 205). Subsequently, the communication band managing mechanism 13 starts the communication rate changing mechanism 12. Upon being started, the communication rate changing mechanism 12 issues a request to the communication rate changing mechanism 22 of the multiplexer 20 to change the communication rate of the router 40 (step 206). Upon receiving this, the communication rate changing mechanism 22 issues an AT command for increasing the communication rate of the communication line 60 to the communication rate changing mechanism 42 of the router 40. Upon receiving a reply of acceptance from the communication rate changing mechanism 42, the communication rate changing mechanism 22 changes the synchronizing clock to increase the communication rate of the communication line 60 and returns a reply of operation completion to the communication rate changing mechanism 12. Upon receiving this reply, the communication rate changing mechanism 12 returns a reply of acceptance for the AT command issued at the step 203 to the communication rate changing mechanism 32 and changes the synchronizing clock to change the communication rate of the communication line 50 to the requested communication rate (step 207).

If it is determined at the step 204 that there are no vacancies in the communication bands, a reply of denial is returned to the communication rate changing mechanism 32 via the communication rate changeing mechanism 12 (step 208). By the above-described processing, the communication rate of the communication line 50 and the communication rate of the communication line 60 and the communication bands assigned to the routers 30 and 40, are preset to the same values, respectively. Also in the case where the communication band is to be increased in response to a request issued by the router 40, processing follows a similar flow.

Figure 5A:
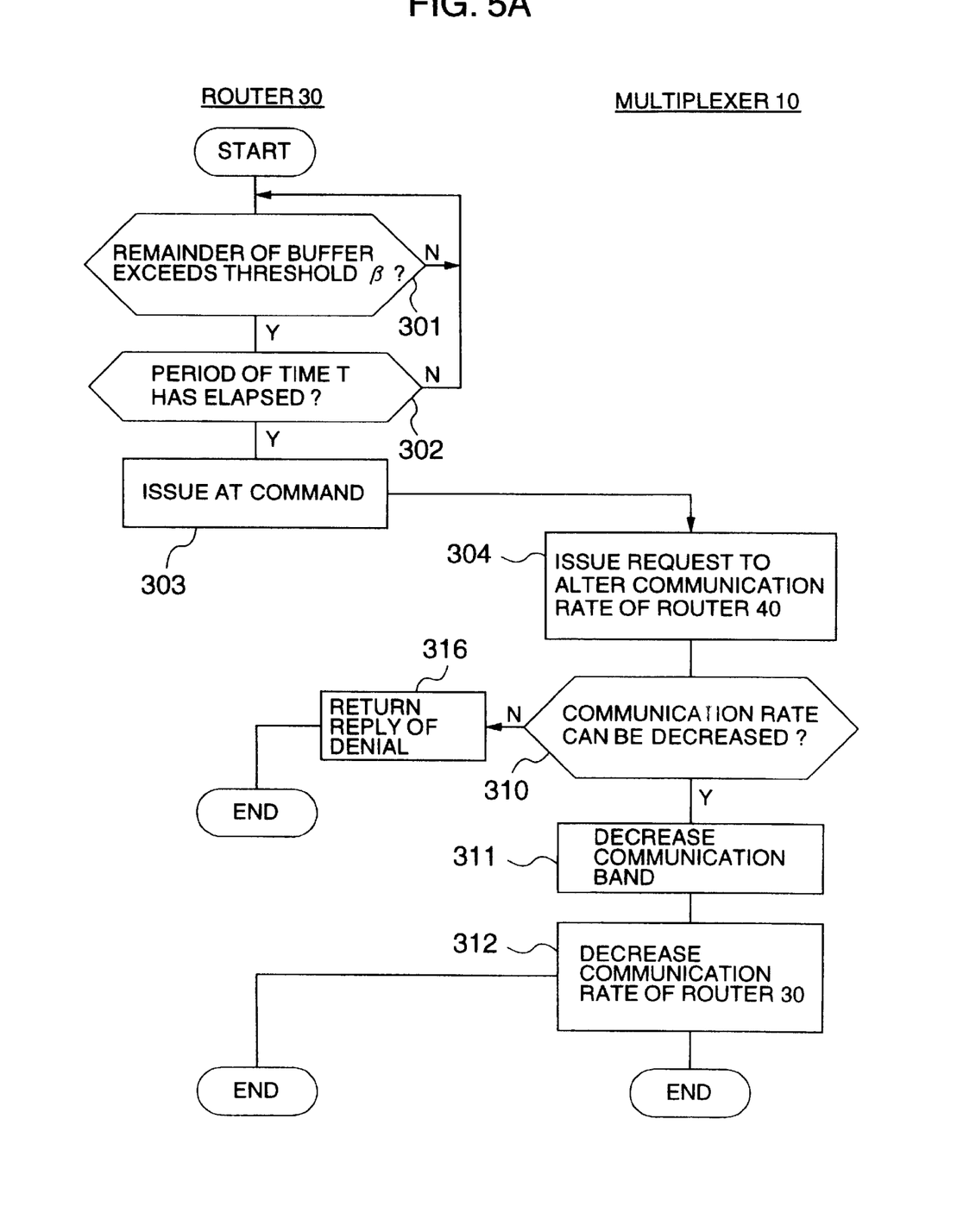
FIG. 5A is a flow chart showing the flow of processing for decreasing the communication band.
Figure 5B:
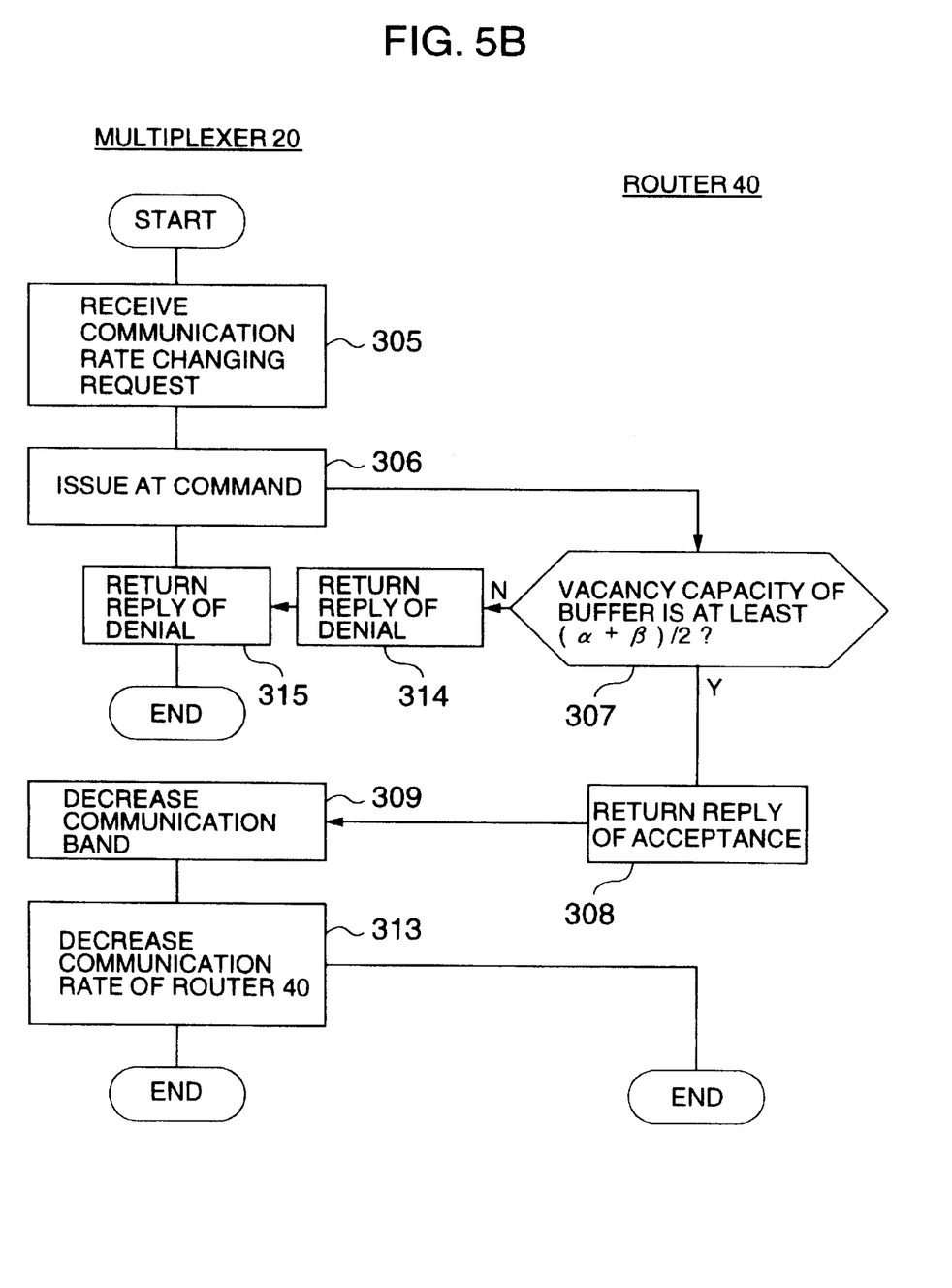
FIG. 5B is a flow chart showing the flow of processing for decreasing the communication band (continuation of FIG. 5A).

FIGS. 5A and 5B are flow charts showing the flow of processing conducted when the communication bands are decreased and the communication rate of the communication line 50 is decreased in response to a request issued by the router 30. As the quantity of data transmitted from the LAN 70 toward the LAN 80 decreases, the quantity of data accumulated in the transmitting buffer within the router 30 decreases and the vacant area in the buffer increases. The data buffer monitoring mechanism 31 monitors the size of the vacant area in the transmitting buffer (step 301). If the size of the vacant area exceeds a predetermined threshold $\beta$, it is determined whether the state continuously lasts for a predetermined period of time T, i.e., whether the period of time T has elapsed since the size of the vacant area in the transmitting buffer exceeded the threshold $\alpha$ (step 302). If the elapse of the period of time T is detected at the step 302, the data buffer monitoring mechanism 31 starts the communication rate changing mechanism 32. The communication rate changing mechanism 32 issues an AT command to the multiplexer 10 (step 303). This AT command includes, as a parameter thereof, information for specifying the communication rate of the next stage of the current communication rate in the direction of the minimum communication rate. Upon receiving the AT command from the router 30, the communication rate changing mechanism 12 of the multiplexer 10 issues a request to the communication rate changing mechanism 22 of the multiplexer 20 to change the communication rate of the router 40 (step 304). Upon receiving this request (step 305), the communication rate changing mechanism 22 issues an AT command for decreasing the communication rate of the communication line 60 to the communication rate changing mechanism 42 of the router 40 (step 306). Upon receiving the AT command, the data buffer monitoring mechanism 41 of the router 40 determines whether the capacity of the vacancy of the transmitting buffer in the router 40 is at least $(\alpha+\beta)/2$ (step 307). If the capacity of the vacancy is at least $(\alpha+\beta)/2$, a reply of acceptance is returned to the multiplexer 20 via the communication rate changing mechanism 42 (step 308). The communication rate changing mechanism 22 of the multiplexer 20 delivers the reply of acceptance sent from the router 40 to the communication band managing mechanism 23. Upon receiving the reply of acceptance, the communication band managing mechanism 23 returns the reply of acceptance to the multiplexer 10. Furthermore, the communication band managing mechanism 23 exchanges the control information with the communication band managing mechanism 13 of the multiplexer 10, changes the value of the communication band assigned to the router 40 and preset in the communication band managing table to a requested value (step 309), and changes the synchronizing clock to decrease the communication rate of the communication line 60 (step 313). Upon receiving the reply from the multiplexer 20, the communication rate changing mechanism 12 determines whether the reply is a reply of acceptance and the communication rate can be decreased (step 310). If the reply is a reply of acceptance, then the communication rate changing mechanism 12 judges it possible to decrease the communication rate and notifies the communication band managing mechanism 13 of the judgment. The communication band managing mechanism 13 changes the value of the communication band assigned to the router 30 and preset in the communication band managing table to a requested value (step 311). Subsequently, the communication rate changing mechanism 12 returns a reply of acceptance to the communication rate changing mechanism 32 in reply to the AT command issued to the communication rate changing mechanism 32 at the step 303 and changes the synchronizing clock to change the communication rate of the communication line 50 to a requested communication rate (step 312).

When the data buffer monitoring mechanism 41 judges at the step 307 that the capacity of the vacancy in the transmitting buffer of the router 40 has not reached $(\alpha+\beta)/2$, the data buffer monitoring mechanism 41 returns a reply of denial to the multiplexer 20 via the communication rate changing mechanism 42 (step 314). When the reply returned from the router 40 is a reply of denial, the communication rate changing mechanism 22 returns a reply of denial to the communication rate changing mechanism 12 of the multiplexer 10 (step 315). If the reply received from the multiplexer 20 is a reply of denial, then the communication rate changing mechanism 12 judges it impossible to decrease the communication rate at the step 310 and returns a reply of denial to the communication rate changing mechanism 32 (step 316).

If in the present embodiment the values of thresholds $\alpha$ and $\beta$ of the vacant area of the transmitting buffer used for judgment when the router requests change of the assignment of the communication bands are nearly equal to each other, then requests for increasing/decreasing the communication rate occur frequently and such a state that the multiplexers 10 and 20 cannot assign communication bands efficiently might be caused. Therefore, it is necessary to make $\beta$ greater than $\alpha$ and preset $\alpha$ and $\beta$ to such values as to obviate useless communication band assigning processing.

In the above described embodiment, a single communication line is installed between a router and a multiplexer and the communication rate of the communication line is changed together with change of the communication band of the multiplexer. In an changenative implementation form, a plurality of communication lines are installed between a router and a multiplexer and the communication rate of each communication line is not changed but fixed. The communication capacity of the communication lines is changed by making the number of available communication lines variable within a range between a minimum number of lines and a maximum number of lines. In this case, each communication rate changing mechanism changes the total communication capacity between the router and the multiplexer by changing each of communication lines between the router and the multiplexer to a usable state or an unusable state. The communication band of the router preset in the communication band managing table and the schedule managing table is equal to the total communication capacity of communication lines preset to the usable state between the router and the multiplexer. Furthermore, in such an implementation form, the steps 104, 207, 312 and 313 and related processing are changed as described hereafter. At the step 104, upon receiving a reply of acceptance from the communication rate changing mechanism, the communication rate changing mechanism of the multiplexer decreases the number of communication lines assuming the usable state between the router and the multiplexer so as to match with the communication rate to be preset. At the step 207, the communication rate changing mechanism of the multiplexer returns a reply of acceptance of the AT command to the communication rate changing mechanism 32 of the router and increases the number of communication lines assuming the usable state by one. At the step 312, the communication rate changing mechanism of the multiplexer returns a reply of acceptance of the AT command to the communication rate changing mechanism 32 of the router and decreases the number of communication lines assuming the usable state among the communication lines between the router and the multiplexer by one. At the step 313 as well, the communication rate changing mechanism decreases the number of communication lines assuming the usable state in the same way.

As understood from the foregoing description, the present invention makes it possible to dynamically assign the communication band of the multiplexer to the inter-network connection unit and consequently make efficient use of the whole of the communication bands held by the multiplexer. As for the above described embodiments, description was given by taking a router as an inter-network connection unit. However, the inter-network connection unit to which the present invention can be applied is not limited to a router, but the present invention can be applied in the same way to the case of gateways as well.

What is claimed is:

1. A method for dynamically assigning communication bands in a network system, said network system including at least a first network and a second network each having a plurality of terminal devices connected thereto, a first inter-network connection unit connected to said first network to perform data transmission between said first network and said second network, a second inter-network connection unit connected to said second network to perform data transmission between said first network and said second network, a first multiplexer connected to said first inter-network connection unit, a second multiplexer connected to said second inter-network connection unit, and a multiplex line for transmitting multiplexed data between said first multiplexer and said second multiplexer, said method comprising the steps of:

detecting arrival of time when a communication band assigned to said first inter-network connection unit is to be change, using said first multiplexer on the basis of information preset in a managing table for managing a communication band to be assigned to said first inter-network connection unit in time base; and changing a communication band assign to the first inter-network connection unit in response to said detection of the arrival of the time of changing.

2. A method for dynamically assigning communication bands according to claim 1, wherein said changing step comprises the step of exchanging control information between said first multiplexer and said second multiplexer to mutually confirm the change of the communication band.

3. A method for dynamically assigning communication bands according to claim 2, wherein said detecting step comprises:

a first detection step for detecting that the time when said communication band is to be changed is a time when the communication band assigned to said first inter-network connection unit is to be decreased; and a second detection step for detecting that the time when said communication band is to be changed is a time when the communication band assigned to said first inter-network connection unit is to be increased.

4. A method for dynamically assigning communication bands according to claim 3, wherein said changing step comprises the step of issuing a command instructing said first inter-network connection unit to decrease the communication rate between the first inter-network connection unit and said first multiplexer when said first detection step has detected arrival of the time when the communication band assigned to said first inter-network connection unit is to be decreased.

5. A method for dynamically assigning communication bands in a network system, said network system including at least a first network and a second network each having a plurality of terminal devices connected thereto, a first inter-network connection unit connected to said first network to perform data transmission between said first network and said second network, a second inter-network connection unit connected to said second network to perform data transmission between said first network and said second network, a first multiplexer connected to said first inter-network connection unit, a second multiplexer connected to said second inter-network connection unit, and a multiplex line for transmitting multiplexed data between said first multiplexer and said second multiplexer, said method comprising the steps of:

monitoring in said first inter-network connection unit a quantity of data transmitted toward said first multiplexer;

transferring a command requesting the change of communication band assignment in accordance with said quantity of transmitted multiplexed data, to said first multiplexer;

receiving said command in said first multiplexer to determine whether the requested change of communication band assignment is possible; and changing the communication band assigned to the first inter-network connection unit on the basis of a result of said determining.

6. A method for dynamically assigning communication bands according to claim 5, wherein said determining step comprises the steps of:

requesting said second multiplexer to change the communication band; and receiving a response returned from said second multiplexer to determine whether the communication band change is possible on the basis of said response.

7. A method for dynamically assigning communication bands according to claim 6, further comprising the steps of:

sending a request from said second multiplexer to said second inter-network connection unit to change the communication rate between the second inter-network connection unit and said second multiplexer;

determining in said second inter-network connection unit whether said communication rate can be decreased in response to the request issued by said second multiplexer;

returning a response to said second multiplexer on the basis of a result of said determining; and transferring a response to the request issued by said first multiplexer, from said second multiplexer to said first multiplexer, on the basis of the response returned from said second inter-network connection unit.

8. A method for dynamically assigning communication bands according to claim 7, wherein said determining in said second inter-network connection unit is performed on the basis of a vacancy capacity of a transmitting buffer possessed by said second inter-network connection unit.

9. A method for dynamically assigning communication bands according to claim 5, wherein said monitoring step comprises the steps of:

monitoring a size of a vacant area of a transmitting buffer included in said first inter-network connection unit;

deciding to increase the communication rate between the first inter-network connection unit and said first multiplexer when the size of the vacant area of the transmitting buffer included in said first inter-network connection unit has become less than a predetermined first capacity; and deciding to decrease said communication rate when the size of the vacant area of the transmitting buffer included in said first inter-network connection unit has exceeded a predetermined second capacity.

10. A method for dynamically assigning communication bands according to claim 9, wherein said first capacity is less than said second capacity.

11. A method of assigning communication bands in a network system including first and second units for communicating data with each other, a first multiplexing unit connected to said first unit, a second multiplexing unit connected to said second unit, and a communication line transmitting multiplexed data between said first multiplexing unit and said second multiplexing unit, comprising the steps of:

detecting, in said first multiplexing unit, arrival of a time at which a communication band to be assigned to said first unit be changed, based on information previously given to manage the communication band to be assigned to said first unit in time basis; and changing the communication band to be assigned to said first unit in response to the detection of arrival of the change time.

12. A multiplexing unit which receives a plurality of input data streams, multiplexes and transmits said input data streams through a communication line, comprising:

a clock;

memory means for holding information for managing, on a time basis, a communication band assigned to a predetermined input data stream among said plurality of input data streams;

communication band managing means for managing said communication band and detecting when the time, as indicated by said clock, reaches a time at which a communication band to be assigned to said predetermined input data stream is to be changed, based on said information held in said memory means; and communication rate change means for changing the communication band to be assigned to said predetermined input data stream in response to the detection of the communication band change time by said communication managing means.

13. A multiplexing unit according to claim 12, wherein said communication rate change means includes a transmission means for transmitting a command instructing the change of communication band.

14. A multiplexing unit according to claim 13, wherein said command includes information designating the communication rate.

* * * * *